US011885461B2

(12) United States Patent
Zlotnikov et al.

(10) Patent No.: US 11,885,461 B2
(45) Date of Patent: Jan. 30, 2024

(54) MECHANISM FOR MOUNTING AN ELECTRONIC DEVICE TO A DROP CEILING T-BAR AND RELATED METHODS

(71) Applicant: CommScope Technologies LLC, Hickory, NC (US)

(72) Inventors: Vadim Zlotnikov, Dallas, TX (US); Michael Brobston, Allen, TX (US); Michael Glatz, McKinney, TX (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

(21) Appl. No.: 17/932,093

(22) Filed: Sep. 14, 2022

(65) Prior Publication Data

US 2023/0126195 A1 Apr. 27, 2023

Related U.S. Application Data

(60) Provisional application No. 63/271,838, filed on Oct. 26, 2021.

(51) Int. Cl.
  *F16M 13/02* (2006.01)
(52) U.S. Cl.
  CPC ................ *F16M 13/027* (2013.01)
(58) Field of Classification Search
  CPC .......... F16M 13/027; B25B 5/00; B25B 5/14; B25B 11/00; B25B 11/02
  See application file for complete search history.

(56) References Cited

U.S. PATENT DOCUMENTS

| | | | | |
|---|---|---|---|---|
| 3,018,080 A * | 1/1962 | Loudon | ................... | E04B 9/006 248/228.4 |
| 3,053,494 A * | 9/1962 | Stoll | ......................... | F16L 3/24 248/228.3 |
| 5,335,890 A * | 8/1994 | Pryor | ...................... | A47H 15/02 248/343 |
| 8,453,988 B2 * | 6/2013 | Simpson | ................. | E04B 9/006 248/228.3 |
| 8,464,563 B2 * | 6/2013 | Perez | .................. | E05B 73/0023 70/57.1 |
| 8,714,502 B1 * | 5/2014 | Davis | ....................... | E04B 9/006 248/228.3 |
| 8,864,089 B2 * | 10/2014 | Hung | ................... | F16M 11/041 248/316.1 |
| 9,159,309 B2 * | 10/2015 | Liu | .......................... | H04R 1/02 |
| 10,774,985 B1 * | 9/2020 | Ortel | ..................... | F16M 11/041 |

(Continued)

*Primary Examiner* — Kimberly T Wood
(74) *Attorney, Agent, or Firm* — Myers Bigel, P.A.

(57) ABSTRACT

The present disclosure describes a mount adapted to being secured to a drop ceiling T-bar. The mount includes a base having a slot, an alignment component coupled to or integral with an adjustable clamp having a clamp end, the alignment component slidably received within the slot such that the adjustable clamp is movable along an axis parallel to the base, at least one stationary clamp coupled to or integral with the base and extending outwardly therefrom, a moveable support coupled to the base via one or more spring-loaded components, and a fastening mechanism configured to secure the adjustable clamp to the base. The clamp end of the adjustable clamp, the at least one stationary clamp, and the moveable support are configured to engage and secure a T-bar therebetween. Mount assemblies and related methods are as described herein.

20 Claims, 8 Drawing Sheets

(56) References Cited

U.S. PATENT DOCUMENTS

| | | | |
|---|---|---|---|
| 11,486,539 B2* | 11/2022 | Wu | E04B 9/006 |
| 2007/0102613 A1* | 5/2007 | Wallace | E04B 9/006 248/343 |

* cited by examiner

MECHANISM FOR MOUNTING AN ELECTRONIC DEVICE TO A DROP CEILING T-BAR AND RELATED METHODS

RELATED APPLICATION(S)

The present application claims priority to and the benefit of U.S. Provisional Patent Application Ser. No. 63/271,838, filed Oct. 26, 2021, the entire content of which is incorporated herein by reference as if set forth fully herein.

FIELD

The present invention relates generally toward telecommunications equipment, and more particularly, a mount adapted for mounting electronic enclosures or other electronic devices to a drop ceiling T-bar and methods related to same.

BACKGROUND

Typically, a drop ceiling has a series of tiles that are support by T-bars. A variety of methods and mechanisms have been used to mount electronic enclosures to these T-bars. Known methods and mechanisms may be suitable for use under certain conditions and unsuitable under others. Some of the limitations include the size of the T-bar (e.g., the width and/or thickness of the flanges of the T-bar) and the ceiling tiles arrangement. In view of the variability of these parameters, an installation method and mechanism may be desired that is highly flexible to accommodate different variations of T-bars and ceiling tiles without using any tools.

SUMMARY

A first aspect of the present invention is directed to a mount adapted to being secured to a drop ceiling T-bar. The mount includes a base having a slot, an alignment component coupled to or integral with an adjustable clamp having a clamp end, the alignment component slidably received within the slot such that the adjustable clamp is movable along an axis parallel to the base, at least one stationary clamp coupled to or integral with the base and extending outwardly therefrom, a moveable support coupled to the base via one or more spring-loaded components, and a fastening mechanism configured to secure the adjustable clamp to the base. The clamp end of the adjustable clamp, the at least one stationary clamp, and the moveable support are configured to engage and secure a T-bar therebetween.

Another aspect of the present invention is directed to a mount assembly. The mount assembly includes an electronic device, an adapter secured to the electronic device, and a mount adapted to being secured to a drop ceiling T-bar. The mount includes a base having a slot, an alignment component coupled to or integral with an adjustable clamp having a clamp end, the alignment component slidably received within the slot such that the adjustable clamp is movable along an axis parallel to the base, at least one stationary clamp coupled to or integral with the base and extending outwardly therefrom, a moveable support coupled to the base via one or more spring-loaded components, one or more equipment fasteners coupled to or integral with the base and extending outwardly therefrom, and a fastening mechanism configured to secure the adjustable clamp to the base. The clamp end of the adjustable clamp, the at least one stationary clamp, and the moveable support engage and secure the drop ceiling T-bar therebetween, and the one or more equipment fasteners engage and secure the adapter to the mount.

Another aspect of the present invention is directed to a method for mounting an electronic device to a drop ceiling T-bar. The method includes the steps of (a) providing a mount, the mount including a base having a slot, an alignment component coupled to or integral with an adjustable clamp having a clamp end, the alignment component slidably received within the slot such that the adjustable clamp is movable along an axis parallel to the base, at least one stationary clamp coupled to or integral with the base and extending outwardly therefrom, a moveable support coupled to the base via one or more spring-loaded components, and a fastening mechanism configured to secure the adjustable clamp to the base; (b) moving the adjustable clamp to an open position by loosening the fastener mechanism and sliding the alignment component within the slot in the base such that the clamp end of the adjustable clamp moves in a direction away from the at least one stationary clamp; (c) positioning the mount such that the at least one stationary clamp hooks onto a flanged section of the T-bar; (d) sliding the alignment component within the slot to move the adjustable clamp toward the T-bar until the clamp end of the adjustable clamp receives an opposing flanged section of the T-bar, during which the one or more spring-loaded components bias the moveable support against the bottom of the flanged sections T-bar; and (e) tightening the fastener mechanism to secure the mount to the T-bar.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim and/or file any new claim accordingly, including the right to be able to amend any originally filed claim to depend from and/or incorporate any feature of any other claim or claims although not originally claimed in that manner. These and other objects and/or aspects of the present invention are explained in detail in the specification set forth below. Further features, advantages and details of the present invention will be appreciated by those of ordinary skill in the art from a reading of the figures and the detailed description of the preferred embodiments that follow, such description being merely illustrative of the present invention.

DETAILED DESCRIPTION

Figure 1:
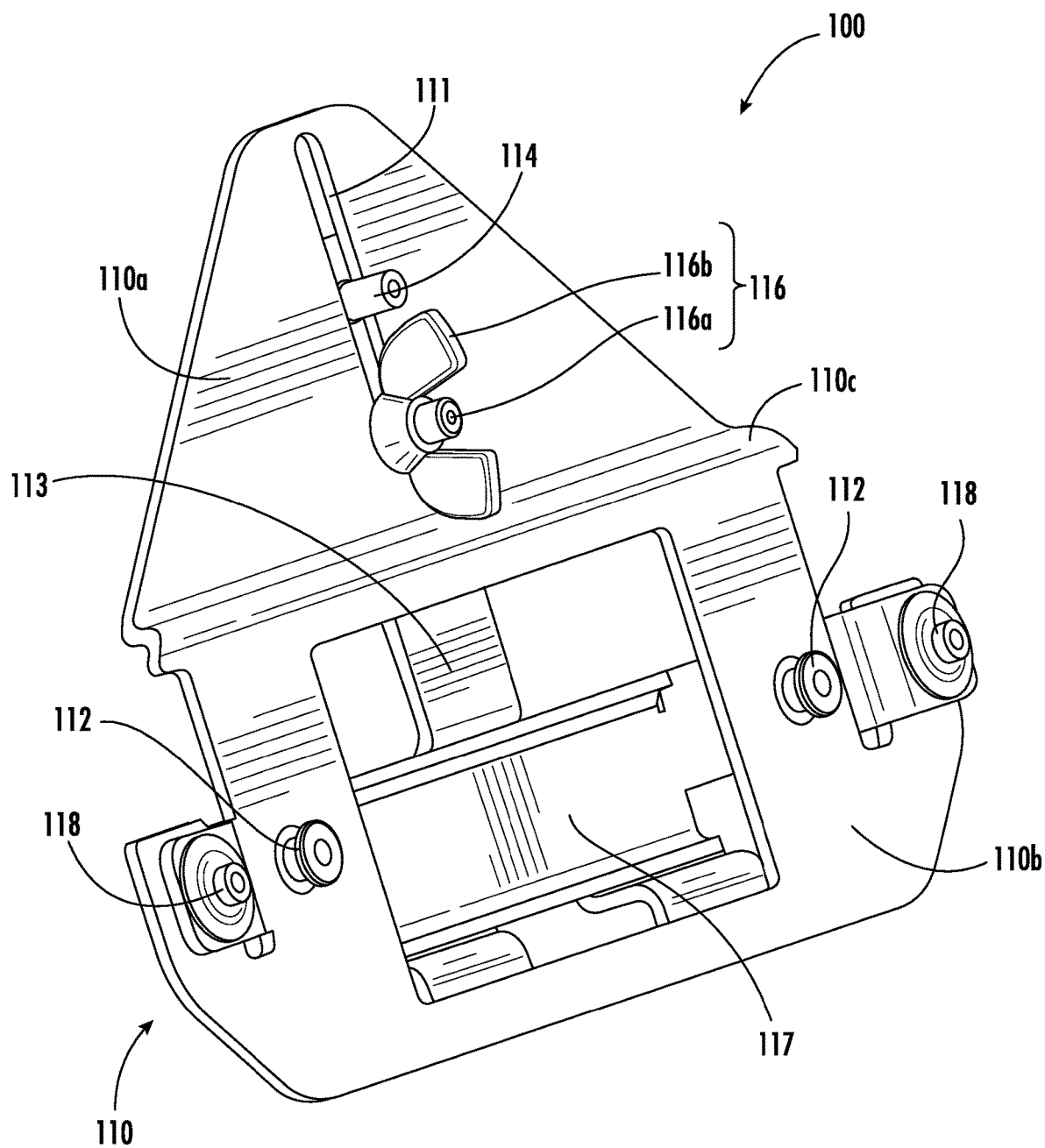
FIG. 1 is a bottom perspective view of a mount adapted for securing to a drop ceiling T-bar according to embodiments of the present invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. In some cases, two-part reference numerals are used in the drawings.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Pursuant to embodiments of the present invention, a mount is provided that may be used to secure electronic enclosures and/or devices to different drop ceiling T-bars having varying widths and/or thicknesses. The mount may provide for rapid, efficient, and toolless installation by a single technician. Embodiments of the present invention will now be discussed in greater detail with reference to FIGS. 1-8.

Referring now to the figures, a mount according to embodiments of the present invention, designated broadly at 100, is illustrated in FIG. 1-8. The mount 100 is adapted to being secured to a T-bar 150 (e.g., for drop ceilings). The mount 100 is adjustable such that it can be secured to different types of T-bars 150 having varying widths ($W_{T-Bar}$) and/or thickness ($T_{T-Bar}$). See, e.g., FIGS. 6A-6B and FIGS. 7A-7C.

Figure 2:
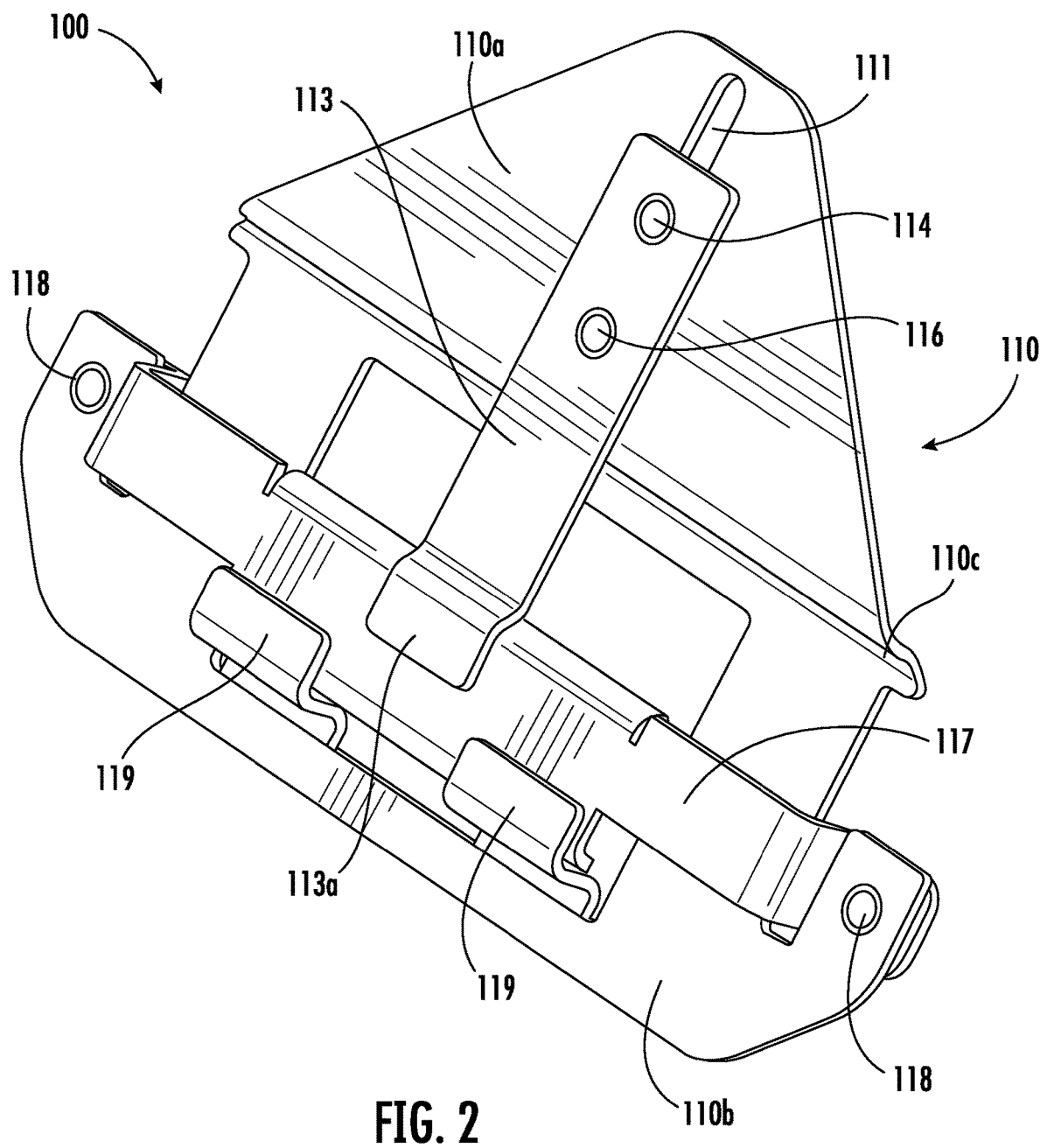
FIG. 2 is a top perspective view of the mount of FIG. 1.

As shown in FIG. 1 and FIG. 2, the mount 100 includes a base 110 having a slot 111 and at least one stationary clamp 119. In some embodiments, the base 110 may include a first section 110a and a second section 110b. The second section 110b may be axially offset from the first section 110a by a transition section 110c. The base 110 may be formed from a variety of rigid materials such as steel, aluminum, or plastic. The at least one stationary clamp 119 is coupled to or integral with the base 110 and extends outwardly therefrom. In some embodiments, the base 110 may have two stationary clamps 119. In some embodiments, the slot 111 resides in the first section 110a of the base 110 and the at least one stationary clamp 119 resides in the second section 110b of the base 110.

Figure 3:
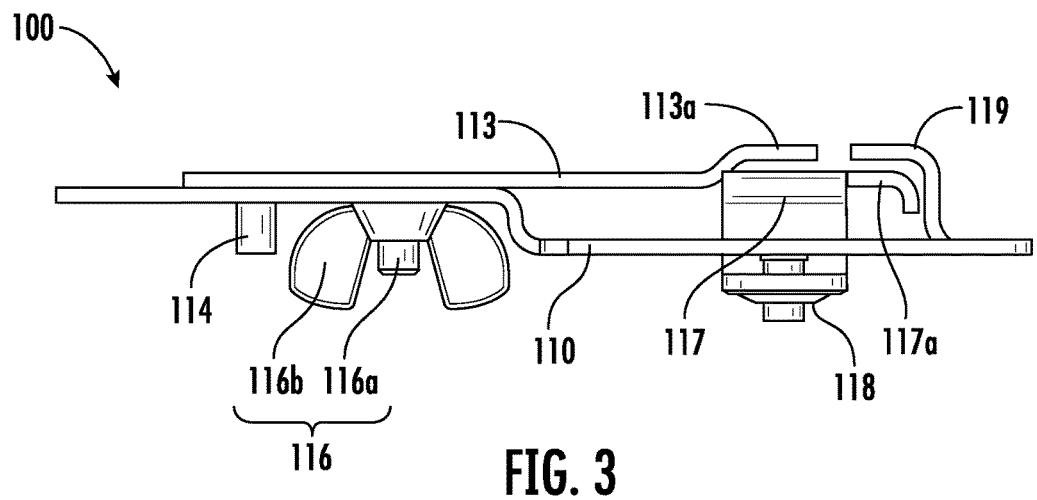
FIG. 3 is a side view of the mount of FIG. 1.
Figure 4:
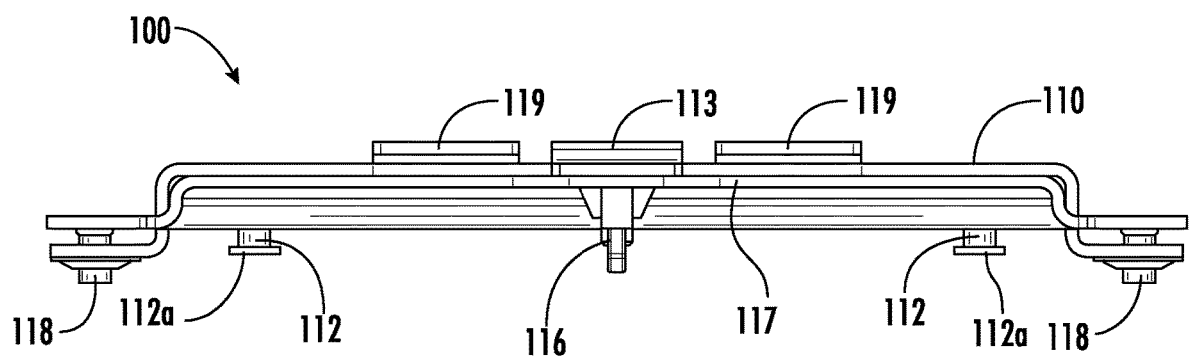
FIG. 4 is a front view of the mount of FIG. 1.
Figure 5A:
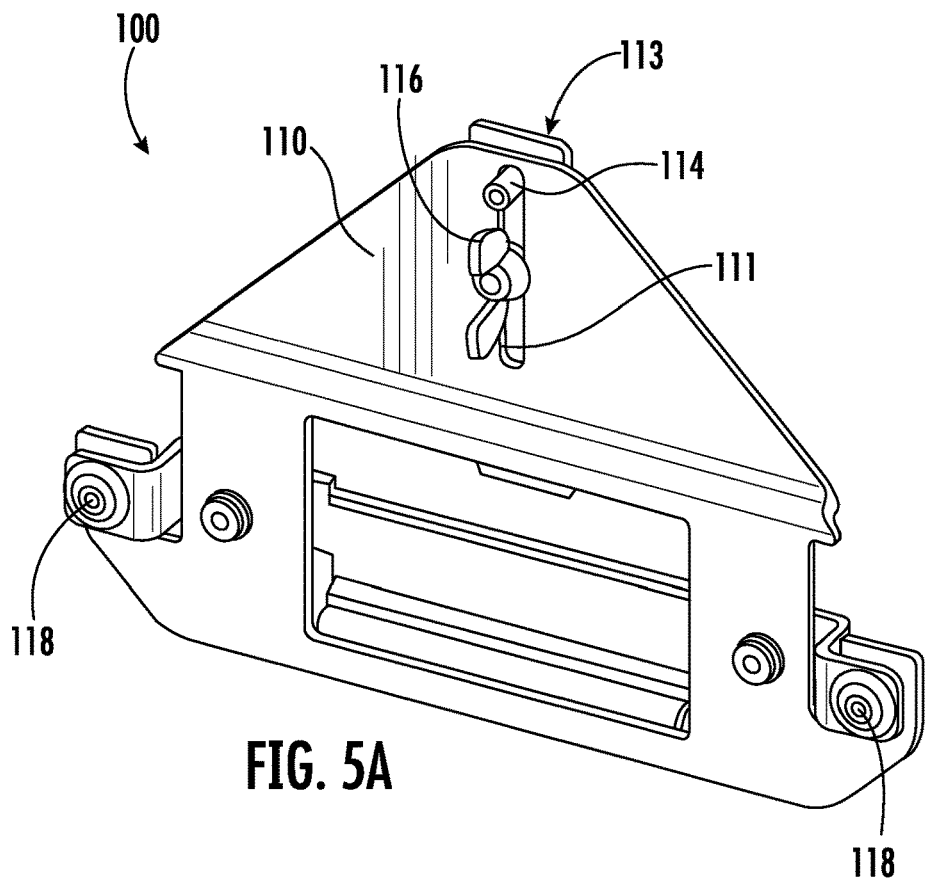
FIG. 5A is a bottom perspective view of the mount of FIG. 1 with an adjustable clamp in a fully opened position.
Figure 5B:
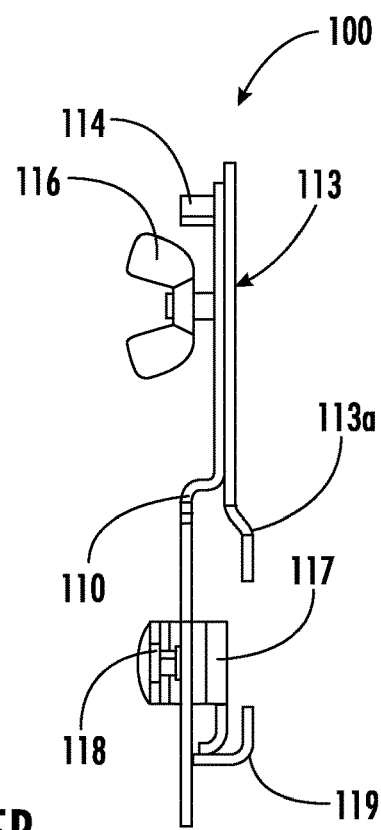
FIG. 5B is a side view of the mount of FIG. 5A.

As shown in FIGS. 1-5B, in some embodiments, the mount 100 further includes an adjustable clamp 113 and a moveable support 117. In some embodiments, a post or other alignment component 114 is coupled to or integral with the adjustable clamp 113 and resides adjacent to one end of the adjustable clamp 113. The alignment component 114 is sized and configured to be received by, and slide within, the slot 111 in the base 110. For example, as shown in FIGS. 5A-5B, the alignment component 114 is positioned (i.e., slid) within the slot 111 such that the adjustable clamp 113 is in a fully opened position (i.e., a clamp end 113a of the adjustable clamp 113 is at its farthest distance away from the stationary clamp(s) 119).

Figure 6A:
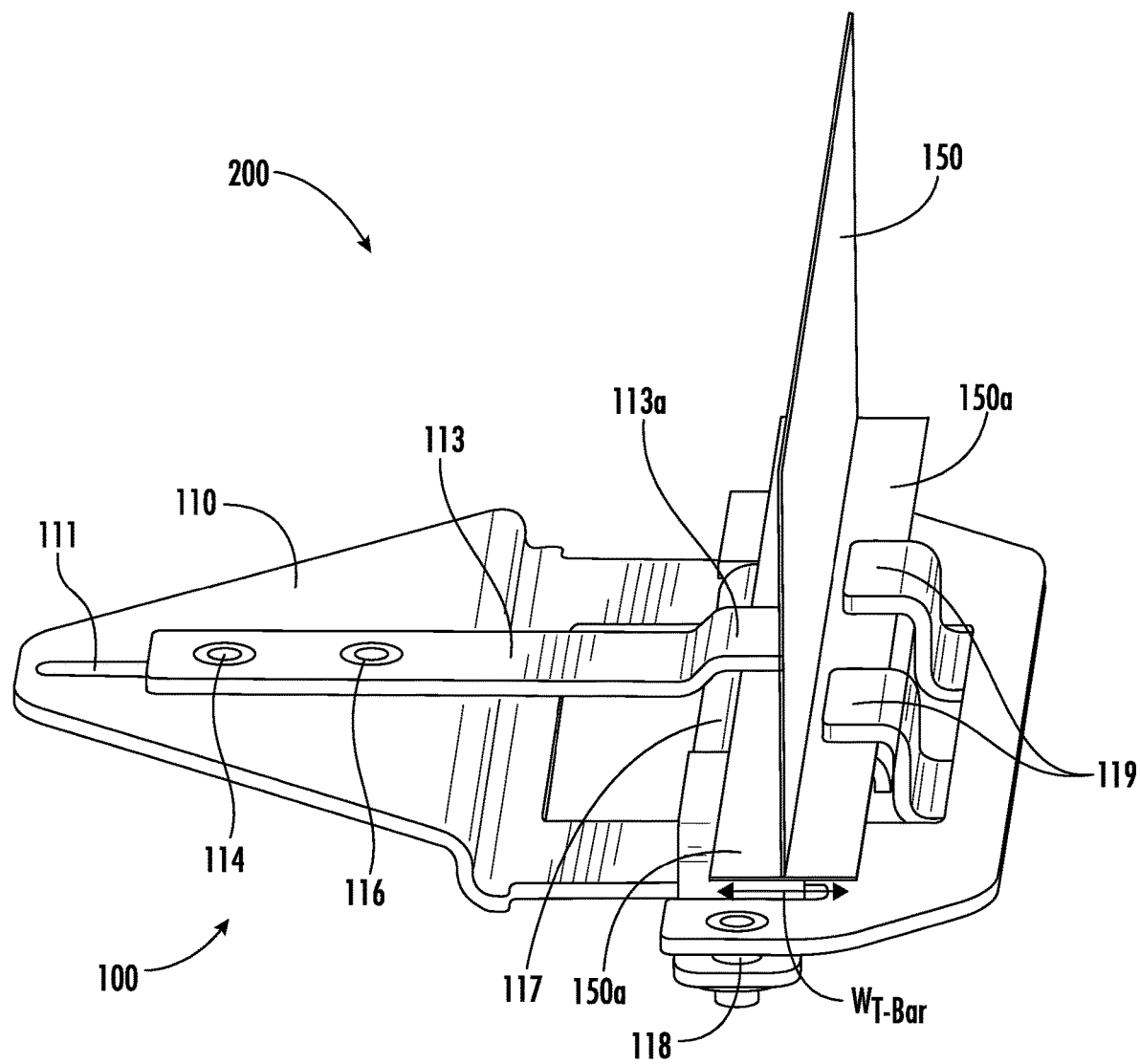
FIG. 6A is a top perspective view of a mount assembly according to embodiments of the present invention illustrating the mount of FIG. 1 with the adjustable clamp in a closed position and secured onto a drop ceiling T-bar.
Figure 6B:
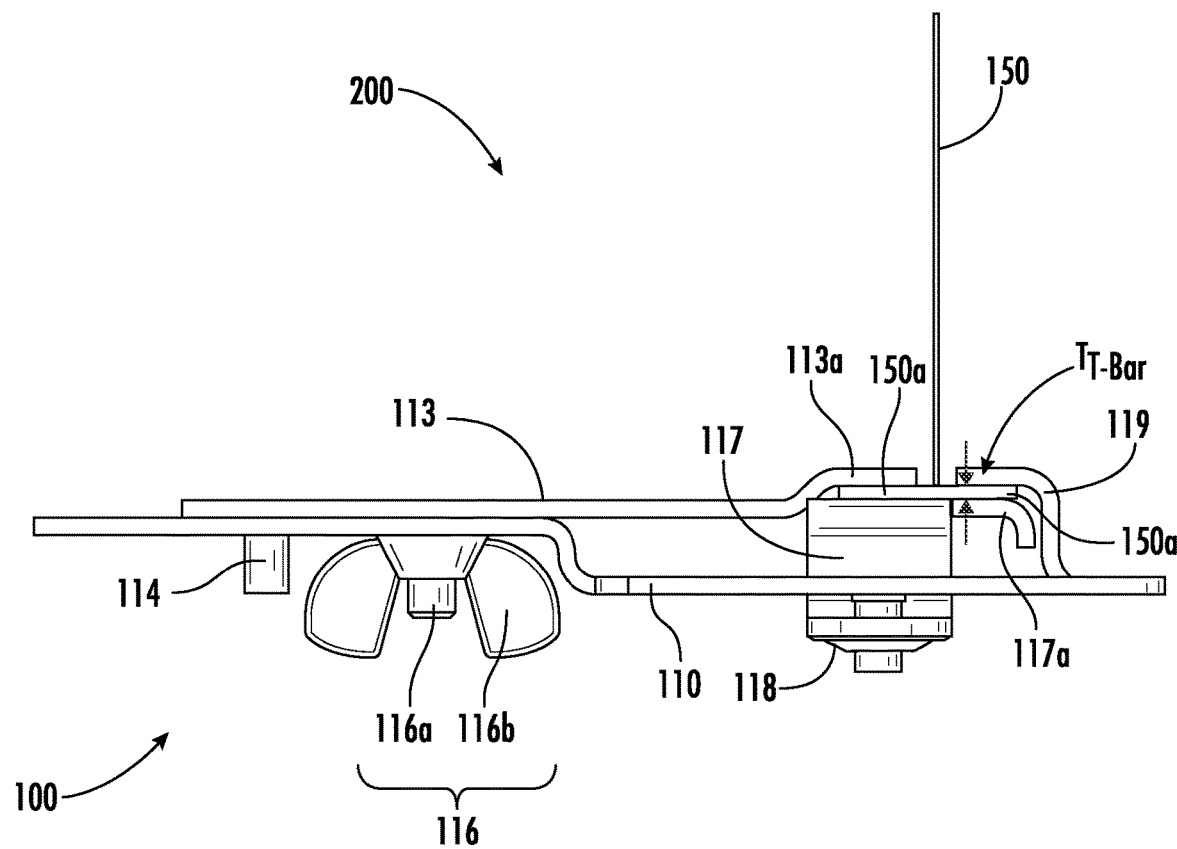
FIG. 6B is a side view of the mount assembly of FIG. 6A.

In contrast, in FIGS. 6A-6B, the alignment component 114 is positioned (i.e., slid) within the slot 111 such that the adjustable clamp 113 is in a closed position (e.g., when the clamp end 113a is secured against a T-bar 150). As described in further detail below, the alignment component 114 slides within the slot 111 to allow movement of the adjustable clamp 113 such that the mount 100 of the present invention can accommodate (i.e., be secured onto) T-bars 150 having varying widths $W_{T-Bar}$ (i.e., different widths $W_{T-Bar}$ of the flanged sections 150a of the T-bar 150) (see, e.g., FIG. 6A). For example, in some embodiments, the mount 100 of the present invention may be secured on T-bars 150 having a width $W_{T-Bar}$ in the range of about 14 mm and about 24 mm.

As shown in FIG. 2 and FIG. 3 and mentioned above, in some embodiments, the opposing end of the adjustable clamp 113 (i.e., the end opposite to the alignment component 114) is bent to form a clamp end 113a. In some embodiments, the clamp end 113a of the adjustable clamp 113 is bent such that a flanged section 150a of the T-bar 150 can be received by the adjustable clamp 113 (see, e.g., FIGS. 6A-6B).

In some embodiments, the adjustable clamp 113 further includes a fastening mechanism 116. The fastening mechanism 116 is configured to secure the adjustable clamp 113 in a position along the base 110 of the mount 100 (e.g., when securing the mount 100 onto a T-bar 150). For example, in some embodiments, at least a portion of the fastening mechanism 116 may extend through the slot 111 in the base 110. When the adjustable clamp 113 is moved to a desired position, the fastening mechanism 116 may be tightened to lock the adjustable clamp 113 in place. In some embodiments, the fastening mechanism 116 may comprise a threaded stud 116a and wing nut 116b (see, e.g., FIGS. 1, 3, 5A-5B, and 6B).

In some embodiments, the moveable support 117 may be coupled to the base 110 of the mount 100 via one or more spring-loaded components 118. As shown in FIGS. 1, 2 and 4, in some embodiments, mount 100 may include two spring-loaded components 118 with each spring-loaded component 118 residing at an opposing end of the moveable support 117. The spring-loaded component(s) 118 allows the moveable support 117 to move along an axis perpendicular relative to the base 110 such that the mount 100 of the present invention can accommodate (i.e., be secured onto) T-bars 150 having varying thicknesses $T_{T-Bar}$ (i.e., different thicknesses $T_{T-Bar}$ of the flanged sections 150a of the T-bar 150) (see, e.g., FIG. 6B). For example, the mount 100 of the present invention can be secured on T-bars 150 having a thickness $T_{T-Bar}$ in the range of about 0.25 mm and about 1.5 mm.

As shown in FIG. 3 and FIG. 6B, in some embodiments, the moveable support 117 may include an extended section 117a. In some embodiments, the extended section 117a may extend outwardly from the moveable support 117 in a direction toward the at least one stationary clamp 119. The extended section 117a may provide additional structural support to the mount 100 when secured onto a T-bar 150 (see, e.g., FIGS. 6A-6B). The extended section 117a may also provide additional securing strength as the moveable support 117 biases against a T-bar 150 secured within the mount 100 (see, e.g., FIGS. 6A-6B).

As shown in FIG. 1 and FIG. 4, in some embodiments, the mount 100 further includes one or more equipment fasteners 112. The one or more equipment fasteners 112 are coupled to or integral with the base 110 and extend outwardly therefrom. As described in further detail below, the one or more equipment fasteners 112 may be configured to engage an adapter 180 that is attached to a unit of equipment 170 (e.g., electronic enclosure or device) to be mounted/secured on the T-bar 150 (see, e.g., FIG. 8). For example, in some embodiments, and shown in FIG. 4, the one or more equipment fasteners 112 may include a flanged edge 112a which may be configured to be received by, and secured within, corresponding slots 183 in the adapter 180 (see, e.g., FIG. 8).

Referring to FIGS. 5A-5B, before installing the mount 100 onto a T-bar 150, the adjustable clamp 113 may be first moved to an open position by loosening the fastening mechanism 116 and sliding the alignment component 114 within the slot 111 in the base 110 such that the clamp end 113a of the adjustable clamp 113 moves in a direction away from the stationary clamp(s) 119.

FIGS. 6A-6B illustrate a mount assembly 200 according to embodiments of the present invention with the mount 100 as described herein secured to a drop ceiling T-bar 150. To install the mount 100 onto the T-bar 150, after the adjustable clamp 113 has been moved to an open position (e.g., FIGS. 5A-5B), the mount 100 may be positioned such that the stationary clamp(s) 119 grab or hook onto one of the flanged sections 150a of the T-bar 150. The adjustable clamp 113 is then moved in a direction toward the T-bar 150 (i.e., alignment component 114 is slid within slot 111 of the base 110 of the mount 100) until the clamp end 113a of the adjustable clamp 113 receives the opposing flanged section 150a of the T-bar 150, thereby allowing the mount 100 of the present invention to be secured to T-bars 150 of varying widths $W_{T-Bar}$ (see, e.g., FIG. 6A). As the adjustable clamp 113 is being positioned and secured to the T-bar 150, the spring-loaded components 118 bias the moveable support 117 against the bottom of the T-bar 150, thereby allowing the mount 100 of the present invention to be secured to T-bars 150 of varying thicknesses $T_{T-Bar}$ (see, e.g., FIG. 6B).

As further shown in FIG. 6B, in some embodiments, one of the flanged sections 150a of the T-bar 150 may be positioned to be secured between the main body of the moveable support 117 and the clamp end 113a of the adjustable clamp 113 and the other flanged section 150a of the T-bar 150 may be positioned to be secured between the extended section 117a of the moveable support 117 and the stationary clamp(s) 119. After the adjustable clamp 113 and moveable support 117 are in position against the T-bar 150, the fastening mechanism 116 may be tightened to secure (i.e., lock) the adjustable clamp 113 to the base 110, thereby securing the mount 100 to the T-bar 150.

Figure 7A:
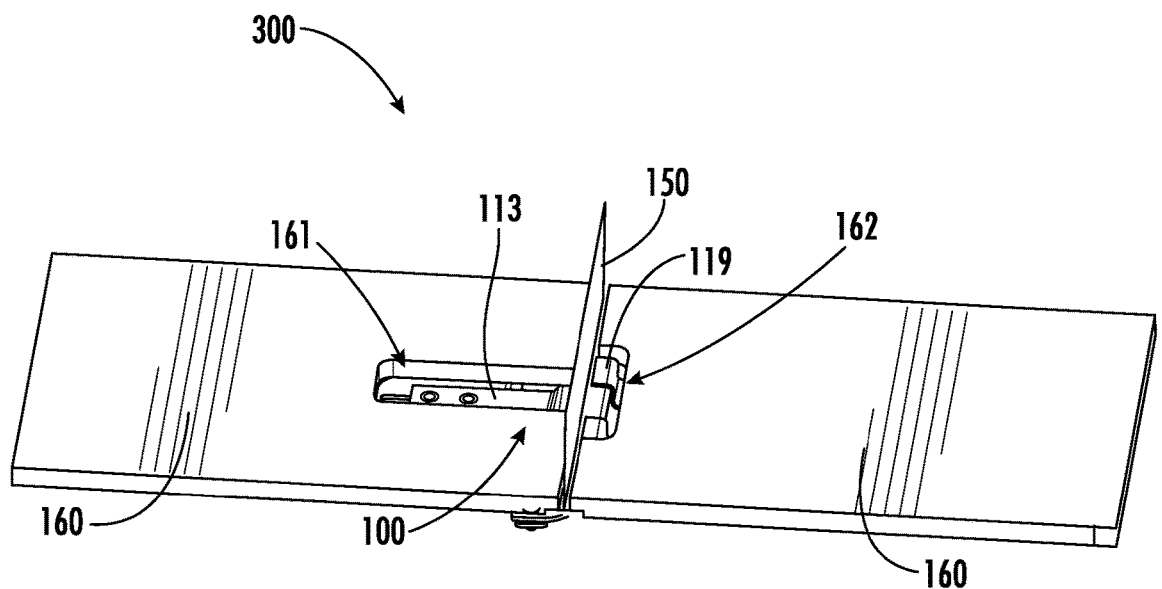
FIG. 7A is a top perspective view of the mount assembly of FIGS. 6A-6B with corresponding drop ceiling titles illustrated.
Figure 7B:
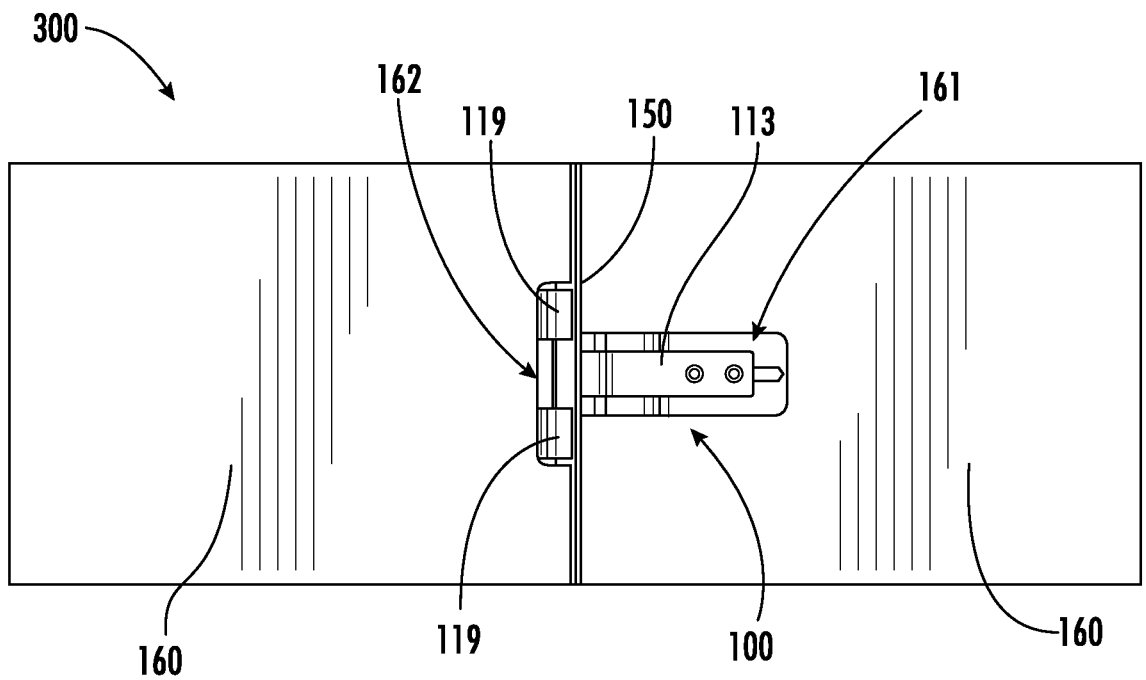
FIG. 7B is a bottom view of the mount assembly of FIG. 7A.
Figure 7C:
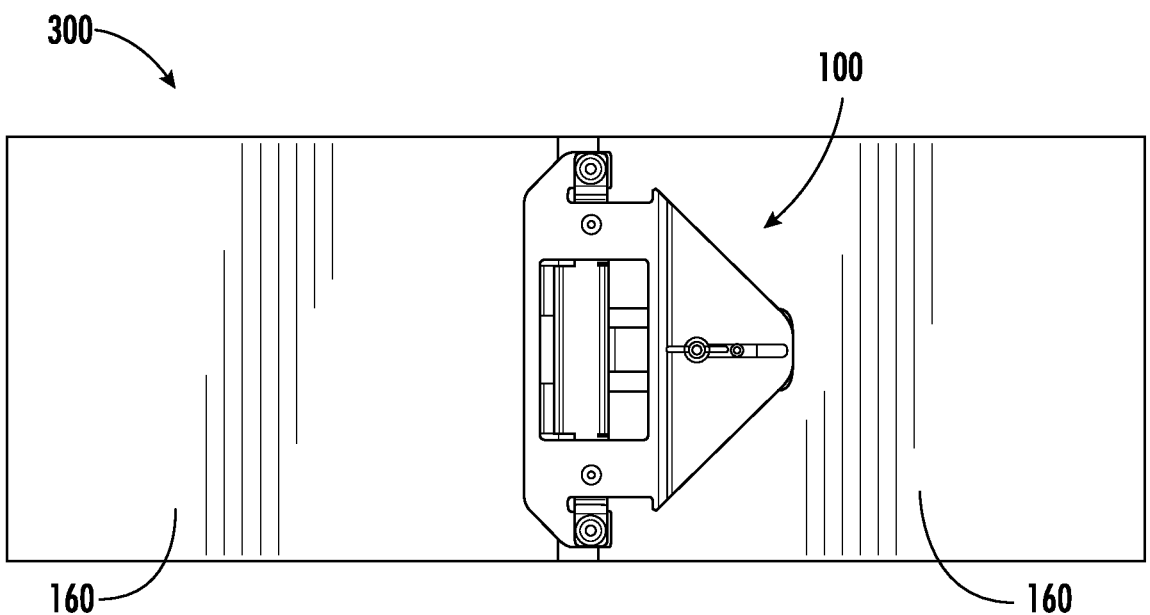
FIG. 7C is a top view of the mount assembly of FIG. 7A.

FIGS. 7A-7C illustrate a mount assembly 300 according to embodiments of the present invention with the mount assembly 200 as described herein and drop ceiling tiles 160 positioned on the T-bar 150. As shown in FIGS. 7A and 7B, recesses 161, 162 may be cut out of the drop ceiling tiles 160 to accommodate the adjustable clamp 113 and stationary clamp(s) 119 of the mount 100.

Figure 8:
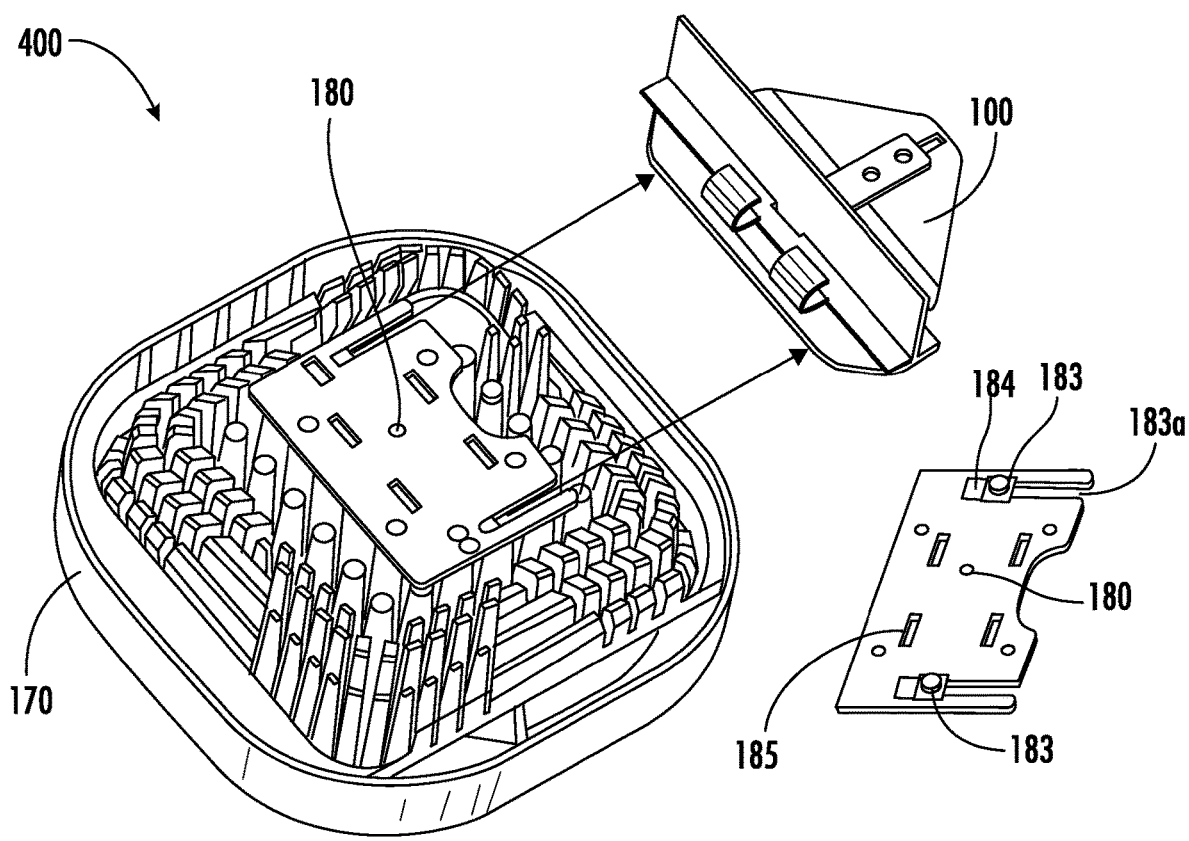
FIG. 8 is an exploded view of a mounting system according to embodiments of the present invention.

FIG. 8 illustrates an exploded view of an assembly 400 according to embodiments of the present invention. As shown in FIG. 8, according to some embodiments, the assembly 400 includes an example unit of equipment 170 (e.g., telecommunications equipment, electronic enclosure, electronic device, or other object) that may be hung (i.e., secured) to the mount 100 described herein. An adapter 180 may be secured to the equipment 170 to assist in securing the equipment 170 to the mount 100. For example, the adapter 180 may be secured to the equipment 170 via fasteners, e.g., screws or bolts (not shown), inserted through mounting holes 185 in the adapter 180. In some embodiments, the adapter 180 further includes one or more engagement features 183 that correspond to the equipment fasteners 112 extending from the base 110 of the mount 100.

As shown in FIG. 8, in some embodiments, the one or more engagement features 183 in the adapter 180 may be slots. In some embodiments, the slots 183 may have an open end 183a configured to receive a corresponding equipment fasteners 112 having a flanged edge 112a (see, e.g., FIG. 4). In some embodiments, a locking mechanism 184 may reside at the opposing end of the slot(s) 183. The equipment fasteners 112 may be received by the open end 183a of a respective slot 183 and slid to engage the corresponding locking mechanism 184, thereby securing the adapter 180 (and corresponding equipment 170) to the mount 100. In some embodiments, the mount 100 of the present invention may be configured to support a load weight of up to about 50 pounds.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A mount adapted to being secured to a drop ceiling T-bar, the mount comprising:
   a base having a slot;
   an alignment component coupled to or integral with an adjustable clamp having a clamp end, the alignment component slidably received within the slot such that the adjustable clamp is movable along an axis parallel to the base;
   at least one stationary clamp coupled to or integral with the base and extending outwardly therefrom;
   a moveable support coupled to the base via one or more spring-loaded components; and
   a fastening mechanism configured to secure the adjustable clamp to the base,
   wherein the clamp end of the adjustable clamp, the at least one stationary clamp, and the moveable support are configured to engage and secure a T-bar therebetween.

2. The mount according to claim 1, wherein the base includes a first section and a second section axially offset by a transition section.

3. The mount according to claim 2, wherein the slot resides in the first section and the at least one stationary clamp extends outwardly from the second section.

4. The mount according to claim 1, wherein at least a portion of the fastening mechanism extends through the slot in the base.

5. The mount according to claim 1, wherein the mount comprises two spring-loaded components, each spring-loaded component residing at an opposing end of the moveable support and configured to bias the moveable support along an axis perpendicular relative to the base.

6. The mount according to claim 1, wherein the moveable support comprises a section extending outwardly toward the at least one stationary clamp.

7. The mount according to claim 1, further comprising one or more equipment fasteners coupled to or integral with the base and extending outwardly therefrom, the one or more equipment fasteners configured to engage an adapter.

8. The mount according to claim 7, wherein the one or more equipment fasteners have a flanged edge configured to be received within a corresponding slot in the adapter.

9. The mount according to claim 7, wherein the adapter is attached to an electronic device.

10. The mount according to claim 1, wherein the fastening mechanism comprises a threaded stud and wing nut.

11. The mount according to claim 1, wherein the adjustable clamp allows the mount to be secured on T-bars having a width in the range of about 14 mm and about 24 mm.

12. The mount according to claim 1, wherein the moveable support allows the mount to be secured on T-bars having a thickness in the range of about 0.25 mm and about 1.5 mm.

13. The mount according to claim 1, wherein the mount is configured to support a load weight of up to about 50 pounds.

14. The mount according to claim 1, in combination with a T-bar for a drop ceiling having opposed flanged sections, wherein flanged sections of the T-bar are secured between the adjustable clamp, the at least one stationary clamp, and the moveable support of the mount.

15. A mount assembly, the mount assembly comprising:
   an electronic device;
   an adapter secured to the electronic device;
   a mount adapted to being secured to a drop ceiling T-bar, the mount comprising:
      a base having a slot;
      an alignment component coupled to or integral with an adjustable clamp having a clamp end, the alignment component slidably received within the slot such that the adjustable clamp is movable along an axis parallel to the base;
      at least one stationary clamp coupled to or integral with the base and extending outwardly therefrom;
      a moveable support coupled to the base via one or more spring-loaded components;
      one or more equipment fasteners coupled to or integral with the base and extending outwardly therefrom; and
      a fastening mechanism configured to secure the adjustable clamp to the base,
   wherein the clamp end of the adjustable clamp, the at least one stationary clamp, and the moveable support engage and secure the drop ceiling T-bar therebetween, and
   wherein the one or more equipment fasteners engage and secure the adapter to the mount.

16. The mount assembly according to claim 15, wherein the mount comprises two spring-loaded components, each spring-loaded component residing at an opposing end of the moveable support and biases the moveable support along an axis perpendicular relative to the base.

17. The mount assembly according to claim 15, wherein the moveable support comprises a section extending outwardly toward the at least one stationary clamp.

18. The mount assembly according to claim 15, wherein the one or more equipment fasteners have a flanged edge received within a corresponding slot in the adapter.

19. A method for mounting an electronic device to a drop ceiling T-bar, the method comprising:
   providing a mount, the mount comprising a base having a slot, an alignment component coupled to or integral with an adjustable clamp having a clamp end, the alignment component slidably received within the slot such that the adjustable clamp is movable along an axis parallel to the base, at least one stationary clamp coupled to or integral with the base and extending outwardly therefrom, a moveable support coupled to the base via one or more spring-loaded components; and a fastening mechanism configured to secure the adjustable clamp to the base;
   moving the adjustable clamp to an open position by loosening the fastener mechanism and sliding the alignment component within the slot in the base such that the clamp end of the adjustable clamp moves in a direction away from the at least one stationary clamp;
   positioning the mount such that the at least one stationary clamp hooks onto a flanged section of the T-bar;
   sliding the alignment component within the slot to move the adjustable clamp toward the T-bar until the clamp end of the adjustable clamp receives an opposing flanged section of the T-bar, during which the one or more spring-loaded components bias the moveable support against the bottom of the flanged sections T-bar; and tightening the fastener mechanism to secure the mount to the T-bar.

20. The method according to claim 19, wherein the mount further comprises one or more equipment fasteners, the method further comprising:

providing an adapter secured to an electronic device, the adapter comprising one or more engagement features;

engaging each of the one or more equipment fasteners with a respective one or more engagement features of the adapter, thereby securing the electronic device to the mount.

* * * * *